United States Patent
Yamasaki et al.

(10) Patent No.: US 7,625,484 B2
(45) Date of Patent: Dec. 1, 2009

(54) WATER TREATMENT APPARATUS

(75) Inventors: Kazuyuki Yamasaki, Hiroshima (JP);
Keichiro Uda, Souraku-gun (JP);
Kazumi Chuhjoh, Ayauta-gun (JP)

(73) Assignee: Sharp Kabuhsiki Kaisha, Osaka (JP)

( * ) Notice: Subject to any disclaimer, the term of this patent is extended or adjusted under 35 U.S.C. 154(b) by 219 days.

(21) Appl. No.: 11/467,194

(22) Filed: Aug. 25, 2006

(65) Prior Publication Data
US 2007/0062869 A1   Mar. 22, 2007

(30) Foreign Application Priority Data
Sep. 16, 2005   (JP)   ............... 2005-270105

(51) Int. Cl.
C02F 3/00   (2006.01)
(52) U.S. Cl. ................... 210/150; 210/221.1
(58) Field of Classification Search ........... 210/745, 210/221.1, 620, 739, 150
See application file for complete search history.

(56) References Cited

U.S. PATENT DOCUMENTS

| | | | | |
|---|---|---|---|---|
| 4,752,383 | A * | 6/1988 | McKay et al. | 209/164 |
| 5,275,732 | A * | 1/1994 | Wang et al. | 210/601 |
| 7,175,764 | B2 * | 2/2007 | Kraft et al. | 210/607 |
| 2003/0146141 | A1 * | 8/2003 | Schneider | 210/221.1 |
| 2005/0040548 | A1 * | 2/2005 | Lee et al. | 261/76 |
| 2006/0061765 | A1 * | 3/2006 | Rezvani et al. | 356/442 |
| 2008/0264843 | A1 * | 10/2008 | Yamasaki et al. | 210/150 |

FOREIGN PATENT DOCUMENTS

| | | |
|---|---|---|
| DE | 102 44 545 | 4/2004 |
| GB | 2 336 905 | 11/1999 |
| JP | 3095620 B | 10/2000 |
| JP | 2000-308900 | 11/2000 |
| JP | 2003-334548 | 11/2003 |
| JP | 3467671 B | 11/2003 |
| JP | 2004-121962 | 4/2004 |

OTHER PUBLICATIONS

European Search Report for corresponding Application No. 06 25 4733 dated Dec. 22, 2006.

* cited by examiner

*Primary Examiner*—Chester T Barry
(74) *Attorney, Agent, or Firm*—Renner, Otto, Boisselle & Sklar, LLP

(57) ABSTRACT

A water treatment apparatus has a turbidity meter, which is a detection part, for detecting a generation state of bubbles in a micro/nano bubble generation state confirmation tank, as a turbidity of treatment water. The water treatment apparatus also has a controller, which is a control part, for receiving an signal representing the turbidity of treatment water detected by the turbidity meter, to control openings of air flow control valves in an interlocked manner in response to the signal, so that the amount of air flowing through the control valves is automatically controlled. The openings of the air flow control valves are controlled in an interlocked manner by the controller in such a way that the signal representing turbidity shows that the treatment water within the confirmation tank is whitely turbid (i.e., the turbidity shows not less than a specified value).

14 Claims, 10 Drawing Sheets

WATER TREATMENT APPARATUS

CROSS-REFERENCE TO RELATED APPLICATIONS

This nonprovisional application claims priority under 35 U.S.C. §119(a) on Patent Application No. 2005-270105 filed in Japan on 16 Sep. 2005, the entire contents of which are incorporated herein by reference.

BACKGROUND OF THE INVENTION

The present invention relates to a water treatment method and a water treatment apparatus, and specifically relates to a water treatment method and a water treatment apparatus used for pretreatment of treatment water where micro/nano bubbles are efficiently generated. Further, the invention relates to a water treatment method and a water treatment apparatus which are capable of greatly enhancing the efficiency in waste water treatment by introducing treatment water, which contains micro/nano bubbles, into a water treatment apparatus following the pretreatment apparatus, so that the water treatment apparatus is made compact as a whole and that the treated water quality is improved.

For commonly-used pretreatment methods and pretreatment apparatuses, there have conventionally been several kinds of water treatment methods and water treatment apparatuses.

As an example, there has been a pretreatment apparatus for biological treatment which performs settling, filtration, pH adjustment, ozone oxidation, adsorption and the like.

The purpose of providing the pretreatment apparatus is to reduce biological, chemical or physical loads for the subsequent-step water treatment apparatus. Thereby it can be expected to achieve downscaling of the water treatment apparatus, reduction in running cost, improvement of water quality in the treated water from the water treatment apparatus, and the like.

Meanwhile, JP 2004-121962A describes the method and apparatus using nano bubbles as a prior art.

This prior art utilizes such characteristics as reduction in buoyancy of nano bubbles, increase in the surface area, increase in the surface activity, generation of local high-pressure fields, and surface activation and bactericidal action by implementation of electrostatic polarization. More specifically, JP 2004-121962A discloses that interrelation between those characteristics makes it possible to lead to various functions such as an adsorption function for dirt components, a high-speed cleaning function for object surfaces, and a bactericidal function. As the result, various objects are cleaned under the high functions and low environmental loads, so that polluted water is cleaned.

JP 2003-334548A describe a nano-bubble generation method as another prior art.

JP 2003-334548A discloses that a method including the steps of (1) transforming part of liquid into cracked gas and (2) applying ultrasonic waves in the liquid, or (3) transforming part of the liquid into cracked gas and applying ultrasonic waves in a liquid.

In the field of water treatment using micro/nano bubbles, it has been desired to efficiently and stably generate micro/nano bubbles in water.

SUMMARY OF THE INVENTION

An object of the present invention is to provide a water treatment method and a water treatment apparatus capable of stably and efficiently generating micro/nano bubbles to perform water treatment.

The present invention provides a water treatment method comprising:

a first step for introducing treatment water to a first bubble treatment tank having a first micro/nano bubble generator;

a second step for introducing the treatment water derived from the first bubble treatment tank to a second bubble treatment tank having a second micro/nano bubble generator to confirm a generation state of bubbles in the second bubble treatment tank; and a step for controlling operations of the first and second micro/nano bubble generators based on a result of the confirmation of the generation state of bubbles in the second step.

According to the present invention, in the first step, treatment water is introduced to the first bubble treatment tank having the first micro/nano bubble generator. In the second step, the treatment water derived from the first bubble treatment tank is introduced to the second bubble treatment tank having the second micro/nano bubble generator, where a generation state of bubbles in the second bubble treatment tank is confirmed. Based on a result of confirming the generation state of bubbles in the second bubble treatment tank, operations of the first and second micro/nano bubble generators are controlled in the third step. In this way, it becomes possible to optimize the water treatment by adjusting the generation state of micro/nano bubbles in the first and second micro/nano bubble generators. Thus, it is possible to improve the treatment efficiency of treatment water treated by using micro/nano bubbles.

In addition, if at least part of the tank wall (e.g., side wall) of the second bubble treatment tank is made of a transparent material, then it becomes possible to visually confirm the generation state of bubbles (e.g., generation of micro/nano bubbles) in the tank.

The present invention also provides a water treatment apparatus comprising:

a first bubble treatment tank to which treatment water is introduced and which has a first micro/nano bubble generator;

a second bubble treatment tank to which the treatment water derived from the first bubble treatment tank is introduced and which has a second micro/nano bubble generator and a detection part for detecting a generation state of bubbles; and a control part for controlling operations of the first and second micro/nano bubble generators based on the generation state of bubbles detected by the detection part.

In the water treatment apparatus of the present invention, the detection part detects a generation state of bubbles in the second bubble treatment tank. The operations of the first and second micro/nano bubble generators are controlled by the control part, based on the generation state of bubbles in the second bubble treatment tank detected by the detection part. This allows water treatment to be optimized by controlling the generation state of micro/nano bubbles from the first and second micro/nano bubble generators. Thus, the treatment efficiency of treatment water is improved by using micro/nano bubbles.

In one embodiment of the present invention, the water treatment apparatus further comprises:

first air suction piping connected to the first micro/nano bubble generator;

second air suction piping connected to the second micro/nano bubble generator;

a first air flow control valve connected to the first air suction piping; and a second air flow control valve connected to the second air suction piping, wherein the detection part is a turbidity meter for detecting turbidity of treatment water within the second bubble treatment tank, and the control part controls an opening of the first air flow control valve and an opening of the second air flow control valve in an interlocked manner based on a signal representing the turbidity inputted from the turbidity meter.

According to the embodiment, the turbidity meter of the second bubble treatment tank detects a turbidity of the treatment water in the second bubble treatment tank. Based on a signal representing the turbidity inputted from the turbidity meter, the control part controls the openings of the first and second air flow control valves in an interlocked manner. Therefore, the openings of the first and second air flow control valves can be controlled in an interlocked manner, for example, in such a way that the signal representing the turbidity shows that the treatment water is whitely turbid (i.e., the turbidity is not less than a specified value) in the second bubble treatment tank. As the result, the generation state of micro/nano bubbles is properly maintained in the first and second bubble treatment tanks. Thus, the treatment efficiency for the treatment water is improved in the first and second bubble treatment tanks.

In one embodiment of the present invention, the first bubble treatment tank has a plurality of the first micro/nano bubble generators, and a submerged pump having header piping to which the plurality of the first micro/nano bubble generators are connected.

According to the embodiment, the water treatment apparatus is simplified in structure by providing a plurality of the first micro/nano bubble generators. Therefore, it is expected to reduce the initial cost of the water treatment apparatus.

In one embodiment of the present invention, the water treatment apparatus further comprises a subsequent-step water treatment apparatus to which the treatment water derived from the second bubble treatment tank is introduced.

According to the embodiment, the treatment water is efficiently pretreated with use of micro/nano bubbles in the first and second bubble treatment tanks. Therefore, treatment efficiency is improved in the subsequent-step water treatment apparatus.

In one embodiment of the present invention, the subsequent-step water treatment apparatus is a biological treatment apparatus.

According to the embodiment, activation of microorganisms in the biological treatment apparatus is enhanced up to the cellular level. Thereby, the treatment efficiency is enhanced. The enhanced activation of microorganisms produces a great effect on the treatment of, for example, hard-to-decompose chemical substances such as decomposition of hard surface active agents.

In one embodiment of the present invention, the subsequent-step water treatment apparatus is a chemical treatment apparatus.

According to the embodiment, micro/nano bubbles catalytically act on chemical reactions in the chemical treatment apparatus. Thereby, the chemical reactions are enhanced.

In one embodiment of the present invention, the subsequent-step water treatment apparatus is a physical treatment apparatus.

According to the embodiment, micro/nano bubbles physically act on the treatment in the physical treatment apparatus. Thereby, filtration or the like can be enhanced in physical treatment power.

In one embodiment of the present invention, the water treatment apparatus further comprises a biological treatment tank to which the treatment water derived from the second bubble treatment tank is introduced and which has a submerged membrane.

According to the embodiment, the biological treatment tank has the submerged membrane, so that the treatment water derived from the first and second bubble treatment tanks, where the generation state of micro/nano bubbles has been confirmed, is introduced into the biological treatment tank,. Thus, in the biological treatment tank having the submerged membrane, it is possible to biologically treat the treatment water in an enhanced state of the microorganism activation, and thereby the treatment efficiency is improved.

In one embodiment of the present invention, the biological treatment tank is a deep biological treatment tank having lower-portion introductory piping for introducing the treatment water derived from the second bubble treatment tank.

According to the embodiment, it is possible to introduce the treatment water, which is derived from the second bubble treatment tank (containing dissolved oxygen with micro/nano bubbles), to a lower portion of the deep biological treatment tank by natural gravitational force with use of the lower-portion introductory piping, which leads to the energy saving in introduction of the treatment water. As compared with a biological treatment method adopting a blower-and-diffuser aeration system, the energy is much more saved in this embodiment.

In one embodiment of the present invention, the deep biological treatment tank has a polyvinylidene chloride filler.

According to the embodiment, since a polyvinylidene chloride filler is provided in the deep biological treatment tank, a higher concentration of microorganisms is obtained in the deep biological treatment tank while microorganisms are effectively stabilized. As a consequence, the treatment efficiency is improved.

In one embodiment of the present invention, the deep biological treatment tank has a first diffuser located above the polyvinylidene chloride filler and below the submerged membrane, and a second diffuser located below the polyvinylidene chloride filler.

According to the embodiment, aeration of the first and second diffusers sufficiently agitates the treatment water in the deep biological treatment tank even when a concentration of microorganisms is high in the tank. This enhances efficiency of the microorganism treatment.

In one embodiment of the present invention, the deep biological treatment tank has a micro/nano bubble generator.

According to the embodiment, since the micro/nano bubble generator is installed in the deep biological treatment tank, the microorganisms are activated at the cellular level in the deep biological treatment tank. At the same time, dissolved oxygen concentration is efficiently enhanced in the tank. Also, the treatment water in the tank is agitated by a water flow which the micro/nano bubble generator generates.

In one embodiment of the present invention, the deep biological treatment tank has a submerged pump having header piping to which the micro/nano bubble generator is connected.

According to the embodiment, since the micro/nano bubble generator is connected to the submerged pump via the header piping, a plurality of micro/nano bubble generators can be fitted to one submerged pump.

In one embodiment of the present invention, the deep biological treatment tank has a polyvinylidene chloride filler.

According to the embodiment, micro/nano bubbles act directly on the microorganisms propagating on the polyvinylidene chloride filler. Thus, the activation of microorganisms is enhanced, and consequently the treatment efficiency is enhanced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinbelow, the present invention will be described in detail by embodiments thereof illustrated in the accompanying drawings.

FIRST EMBODIMENT

Figure 1:
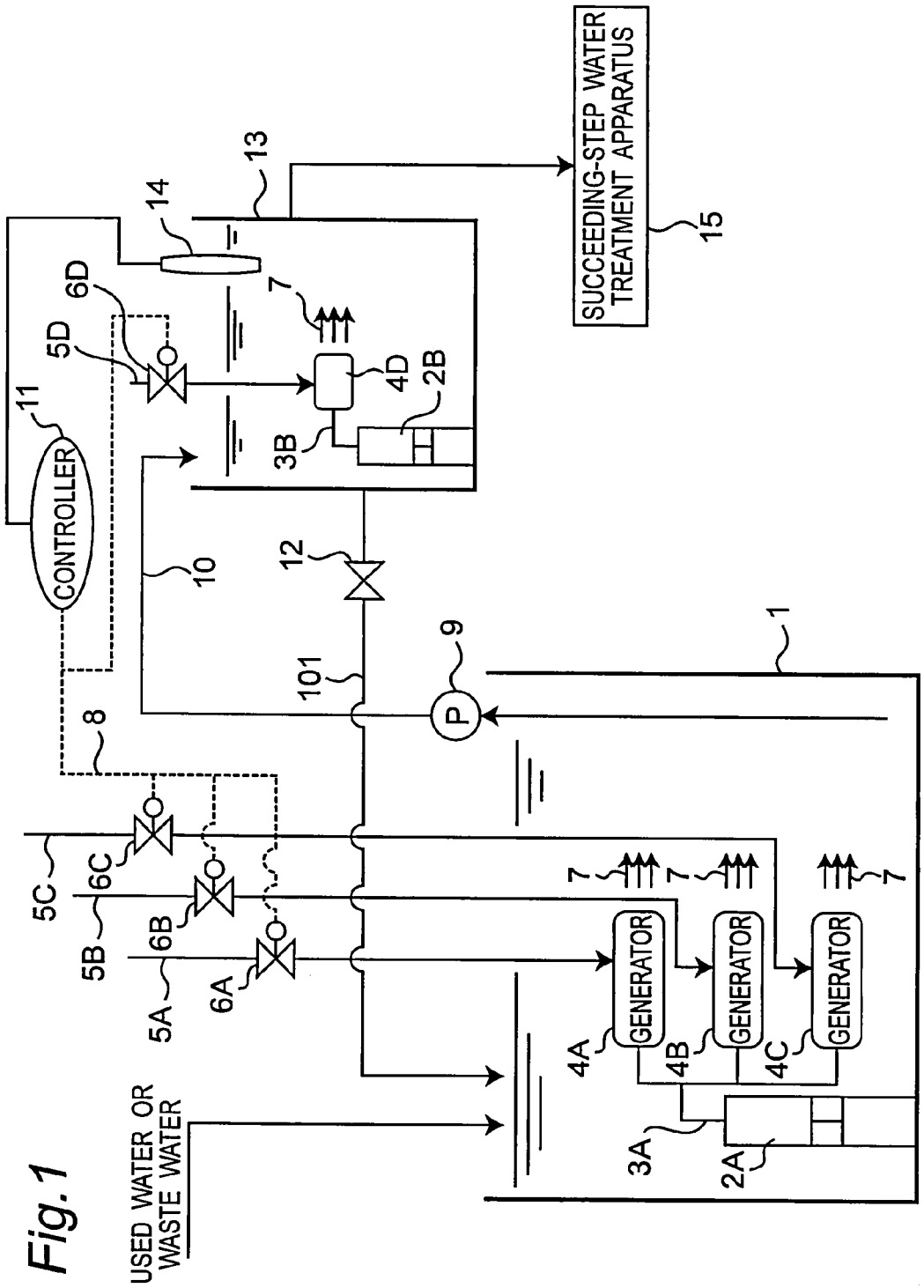
FIG. 1 is a view schematically showing a first embodiment of the water treatment apparatus according to the present invention.

FIG. 1 schematically shows a first embodiment of the water treatment apparatus according to the invention.

With reference to FIG. 1, reference numeral 1 denotes a first bubble treatment tank. This first bubble treatment tank 1 has three micro/nano bubble generators 4A, 4B, 4C. Quantity and quality of used water or waste water introduced into the first bubble treatment tank 1 is adjusted by flows 7 of water containing micro/nano bubbles discharged from the three micro/nano bubble generators 4A, 4B, 4C.

Used water, which is introduced to the first bubble treatment tank 1, is exemplified by industrial water, city water, well water, river water, and the like. Waste water is exemplified by industrial waste water, domestic waste water, and the like. The industrial waste water is for example waste water from semiconductor factories. A feature of the waste water from semiconductor factories is that various types of chemicals are mixed in the waste water. The chemicals are mainly used for cleaning of wafers or the like in the clean room, and therefore, less suspended matters are contained in the industrial waste water, in general. Also, the used water introduced into the first bubble treatment tank 1 may be raw water used as ultrapure water.

The water tank of the first bubble treatment tank 1 is provided with header piping 3A which connects a submerged pump 2A and the three micro/nano bubble generators 4A-4C to each other. Three micro/nano bubble generators are shown in the figure. However, the number of the micro/nano bubble generators is not limited to three. Four or more generators, if necessary, may be installed in the first bubble treatment tank 1.

The used water or waste water is sucked as treatment water by the submerged pump 2A which pressurizes the treatment water up to a pressure of 1.5 kg/cm$^2$ or more required by the micro/nano bubble generators 4A-4C. That is, the discharge pressure of the submerged pump 2A needs to be 1.5 kg/cm$^2$ or more. The piping 3A serves for the role of a header piping used for installing a required number of the micro/nano bubble generators. In this embodiment, three micro/nano bubble generators 4A-4C are installed.

To make micro/nano bubbles, the micro/nano bubble generators 4A-4C are connected to air suction piping 5A-5C, respectively. On air suction piping 5A-5C, air flow control valves 6A-6C are provided for controlling air to obtain the necessary amount of air. This makes it possible to discharge water containing micro/nano bubbles as water flows 7 from the micro/nano bubble generators 4A-4C. The micro/nano bubble generators 4A-4C has small holes for micro/nano bubble generation, and therefore such a trouble as clogging may be caused when 1 mm or more larger suspended matters are present. On the other hand, waste water from semiconductor factories has less suspended matters. Therefore, it is less likely that the trouble of clogging occurs due to suspended matters. That is, the semiconductor industrial waste water is suitable as feed water introduced to the micro/nano bubble generators 4A-4C because suspended matters are scarcely contained in the waste water.

Further, the bubble treatment tank 1 is provided with a bubble treatment tank pump 9. When the bubble treatment tank pump 9 is driven, the treatment water of used water or waste water is transferred via discharge piping 10 to a micro/nano bubble generation state confirmation tank 13. The micro/nano bubble generation state confirmation tank 13 serves as a second bubble treatment tank.

A submerged pump 2B and a micro/nano bubble generator 4D are installed in the micro/nano bubble generation state confirmation tank 13, as in the case of the first bubble treatment tank 1. Header piping 3B is provided for connecting the submerged pump 2B and the micro/nano bubble generator 4D to each other. Only one micro/nano bubble generator 4D is installed in the micro/nano bubble generation state confirmation tank 13 as an example in the first embodiment. However, a plurality of micro/nano bubble generators may be installed therein.

The purpose of installing the micro/nano bubble generation state confirmation tank 13 is to confirm the generation state of micro/nano bubbles. The micro/nano bubble generator 4D in the micro/nano bubble generation state confirmation tank 13 is connected to air suction piping 5D. On the air suction piping 5D, an air flow control valve 6D is provided for controlling air to obtain the amount of air necessary for production of micro/nano bubbles. In the first embodiment, the micro/nano bubble generation state confirmation tank 13 is made of transparent vinyl chloride. This transparent material makes it possible to visually and easily confirm a generation state of micro/nano bubbles, which have been generated in the micro/nano bubble generator 4D, in the micro/nano bubble generation state confirmation tank 13. In contrast to this, because the first bubble treatment tank 1 has a larger capacity than the micro/nano bubble generation state confirmation tank 13, the first bubble treatment tank 1 is strongly constructed by using steel and/or concrete for example. In many cases, therefore, it is arder to directly confirm the generation state of micro/nano bubbles.

The micro/nano bubble generation state confirmation tank 13 is provided with a turbidity meter 14 and a controller 11 serving as a control part. The turbidity meter 14 detects turbidity of treatment water in the confirmation tank 13, and inputs a signal representing the resulting turbidity to the controller 11. In response to the turbidity represented by the signal from the turbidity meter 14, the controller 11 automatically controls the opening of the air flow control valve 6D. Thereby the amount of air flowing through the control valve 6D is automatically controlled. When micro/nano bubbles have been sufficiently generated in the micro/nano bubble generation state confirmation tank 13, the treatment water in the tank becomes whitely turbid. As the result, the turbidity meter 14 outputs a signal to indicate a high numerical value for turbidity. Conversely, when micro/nano bubbles have not been sufficiently generated in the confirmation tank 13, the treatment water in the tank does not become whitely turbid. In consequence, the turbidity meter 14 a signal to indicates a low numerical value.

Accordingly, the controller 11 controls the openings of all the air flow control valves 6A-6C and 6D so that the treatment water turns to be cloudy (i.e., the turbidity equal to or more than a specified value) in the confirmation tank 13 as a second bubble treatment tank. Thereby, micro/nano bubbles are properly generated and maintained in both the first bubble treatment tank 1 and the confirmation tank 13 as the second bubble treatment tank. Thus, it is achieved to improve the treatment efficiency of treatment water in the first bubble treatment tank 1 and the confirmation tank 13.

Also, the micro/nano bubble generation state confirmation tank is connected to piping 101 with a valve 12 for returning of treatment water to the bubble treatment tank 1. The treatment water containing micro/nano bubbles is circulated between the micro/nano bubble generation state confirmation tank 13 and the bubble treatment tank 1 by using the piping 101, the valve 12, the discharge piping 10 and the bubble treatment tank pump 9. Thus, the treatment water is subjected to micro/nano bubble treatment while the micro/nano bubbles are dissolved into the treatment water as much as possible.

Next, the treatment water is introduced from the micro/nano bubble generation state confirmation tank 13 to a succeeding-step water treatment apparatus 15. Then, the treatment water is subjected to further treatment in the succeeding-step water treatment apparatus 15.

In addition, any types of the micro/nano bubble generators 4A-4D may be used without any limitations of their manufacturers as long as they are commercially available. In this embodiment, specifically, the generators made by Nanoplanet Research Inst. are employed. As an example of other commercial products, there is micro-bubble water manufacturing apparatus made by Aura Tec Co., Ltd. or Seika Corporation. They are preferably selected in accordance with the intended use.

Three types of bubbles are explained here.

(i) Normal-size bubbles (air bubbles) ascend in water until they burst at the surface to dissipate in the end;

(ii) Micro-size bubbles are minute air bubbles whose diameter is not more than 50 micron meters ($\mu$m) and which may be reduced in water until they dissipate (completely dissolve) in the end;

(iii) It is said that Nano-size bubbles are even smaller bubbles (not more than 1 micron or in the diameter range of 100-200 nm) than micro bubbles and which can continue to exist in water. Therefore, micro/nano bubbles are bubbles in which micro bubbles and nano bubbles are mixed.

As pretreatment of treatment water, various types of used water or waste water are subjected to micro/nano bubble treatment in the bubble treatment tank 1 and the micro/nano bubble generation state confirmation tank 13, so that the load can be reduced in the succeeding-step water treatment appratus 15.

SECOND EMBODIMENT

Figure 2:
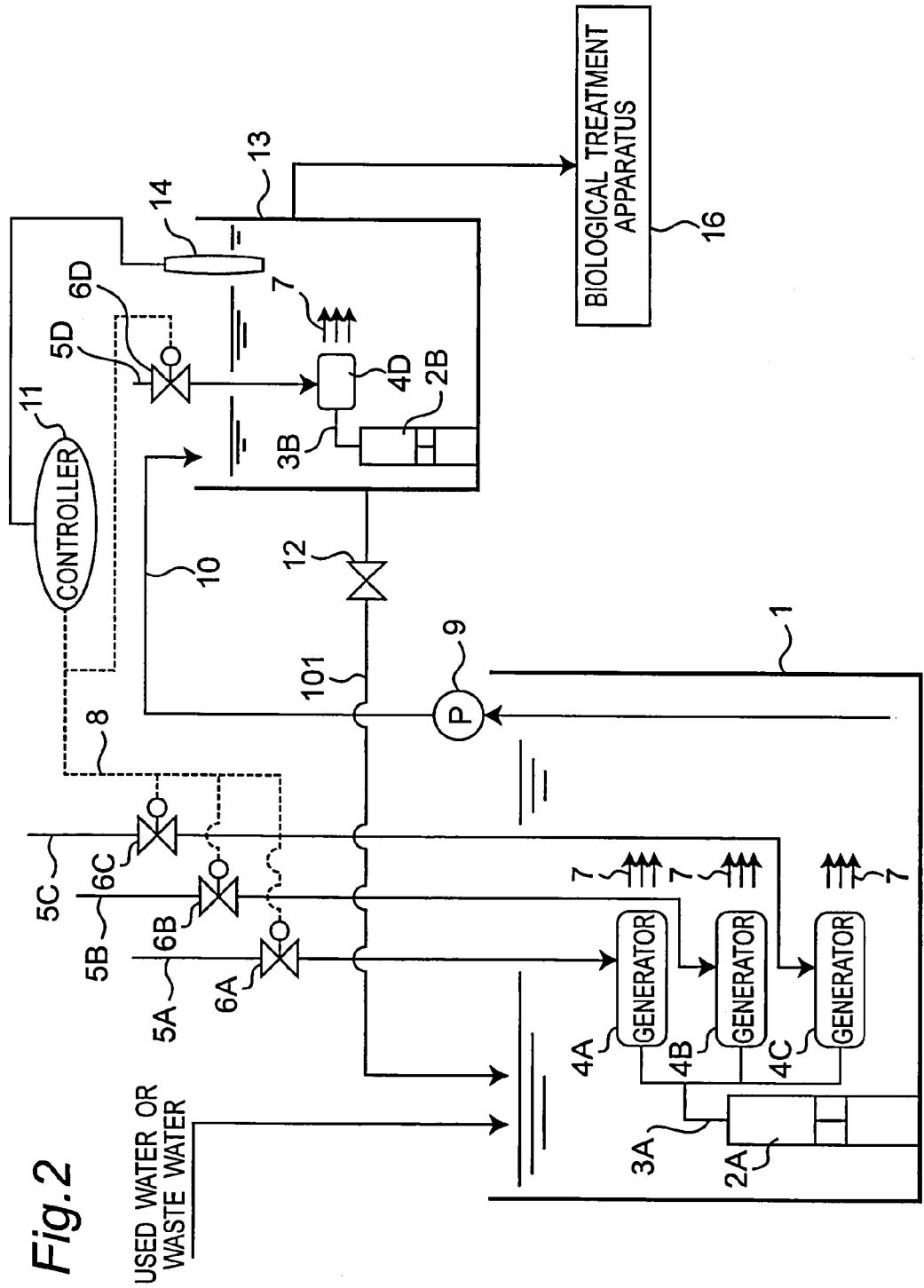
FIG. 2 is a view schematically showing a second embodiment of the water treatment apparatus according to the invention.

Next, FIG. 2 shows a second embodiment of the water treatment apparatus according to the invention.

The second embodiment differs from the first embodiment in that a biological treatment apparatus 16 is installed to substitute for the succeeding-step water treatment apparatus 15 of the first embodiment. In the second embodiment, therefore, the same constituent parts as those of the first embodiment are designated by the same reference numerals, and their detailed description is omitted. Only constituent parts different from the first embodiment are explained hereinafter.

The biological treatment apparatus 16 in the second embodiment is an aeration tank, catalytic oxidation tank, or the like.

In order to reduce the load on the biological treatment apparatus 16 to the utmost extent, micro/nano bubbles are used for pretreatment of treatment water, that is, used water or waste water in the second embodiment. Thereby, the biological treatment apparatus 16 is downsized. Specifically, the pretreatment is conducted with use of micro/nano bubbles, and then, the treatment water containing micro/nano bubbles is introduced into the biological treatment apparatus 16, so that the micro/nano bubbles can activate microorganisms to propagate in the biological treatment apparatus 16. This allows the biological treatment apparatus 16 to be downsized.

It is said that nano bubbles exist for one month or more in treatment water. Nano bubbles dissolved in the treatment water make it possible to maintain the amount of dissolved oxygen in the treatment water within the biological treatment apparatus 16, which allows the amount of aeration air to be saved.

For a specific example, in the case where development waste liquid is treated as semiconductor industrial waste water, both the bubble treatment tank 1 and the micro/nano bubble generation state confirmation tank 13 can be installed for use as pretreatment apparatuses with regard to the biological treatment apparatus 16.

There are two kinds of systems for the biological treatment apparatuses to biologically treat the development waste liquid. The first system is combination of normal aeration tank and settling tank. The second is a waste liquid treatment system given by only an aeration tank, which utilizes submerged membrane, without a settling tank. In either case, both the bubble treatment tank 1 and the micro/nano bubble generation state confirmation tank 13 are adoptable as the pretreatment apparatus.

THIRD EMBODIMENT

Figure 3:
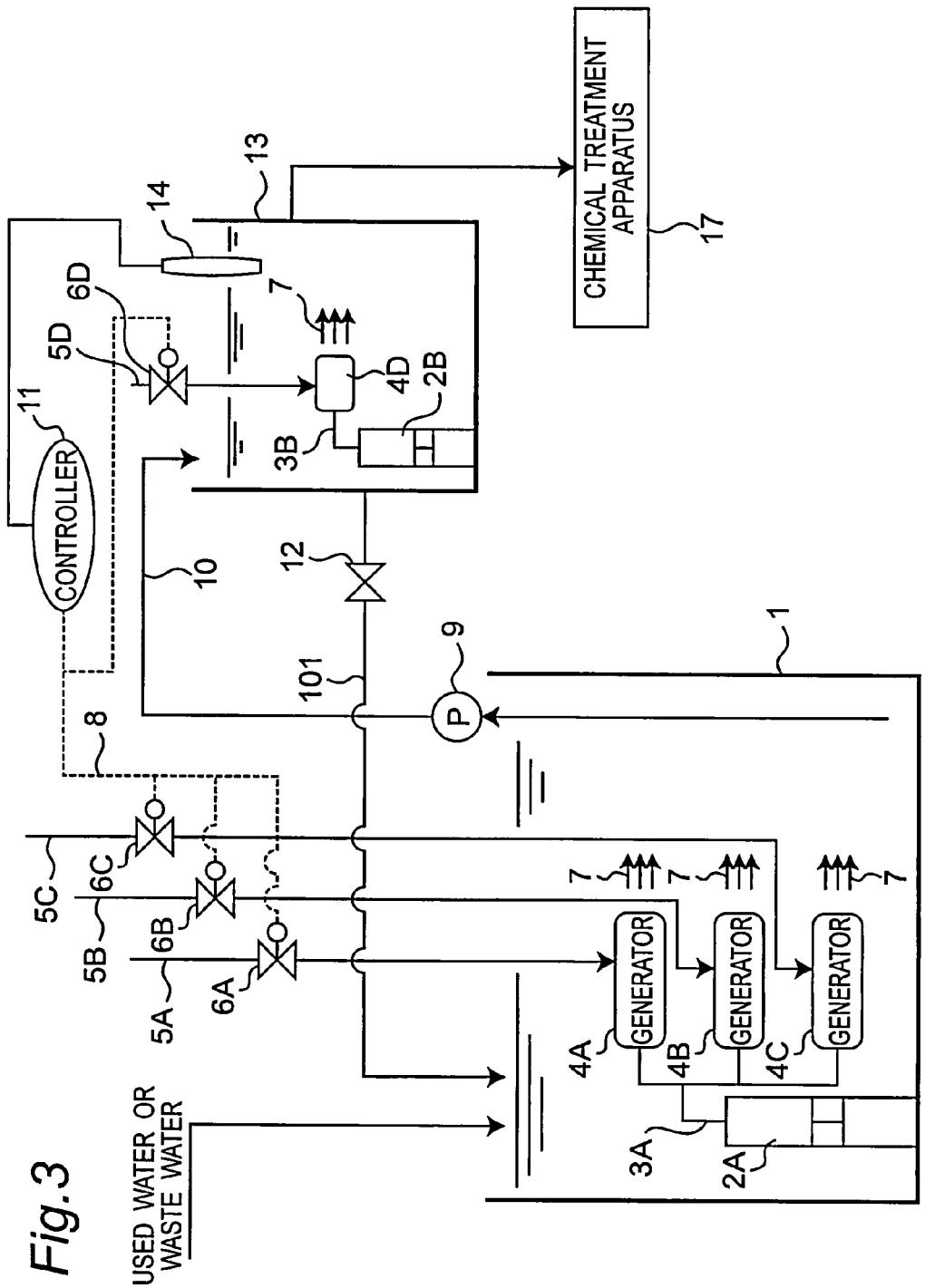
FIG. 3 is a view schematically showing a third embodiment of the water treatment apparatus according to the invention.

FIG. 3 shows a third embodiment of the water treatment apparatus according to the invention.

In the third embodiment, a chemical treatment apparatus 17 is installed to substitute for the succeeding-step water treatment apparatus 15 of the first embodiment. In the third embodiment, therefore, the same constituent parts as those of the first embodiment are designated by the same reference numerals, and their detailed description is omitted. Only constituent parts different from the first embodiment are explained hereinafter.

With regard to actions of micro/nano bubbles, it has proved that micro/nano bubbles act on chemical reactions catalytically. Therefore, chemical reactions in the chemical treatment apparatus 17, which is installed following the bubble treatment tank 1 and the micro/nano bubble generation state confirmation tank 13, can be made to progress faster than general chemical reactions by virtue of the catalytic actions of the micro/nano bubbles.

It is said that micro bubbles in the treatment water continue to exist in the treatment water for several minutes and that nano bubbles exist in the treatment water for one month or more. Therefore, introduction of treatment water containing micro/nano bubbles into the chemical treatment apparatus 17 produces an effective influence on acceleration of chemical reactions.

Specifically, the chemical treatment apparatus 17 is a chemical treatment apparatus for hydrofluoric acid waste water as semiconductor industrial waste water. In this case, fluorine in the hydrofluoric acid waste water is treated by chemically forming calcium fluoride due to addition of calcium hydroxide (slaked lime) in the chemical treatment apparatus. Then, the treatment water containing micro/nano bubbles effectively accelerate the chemical reactions.

FOURTH EMBODIMENT

Figure 4:
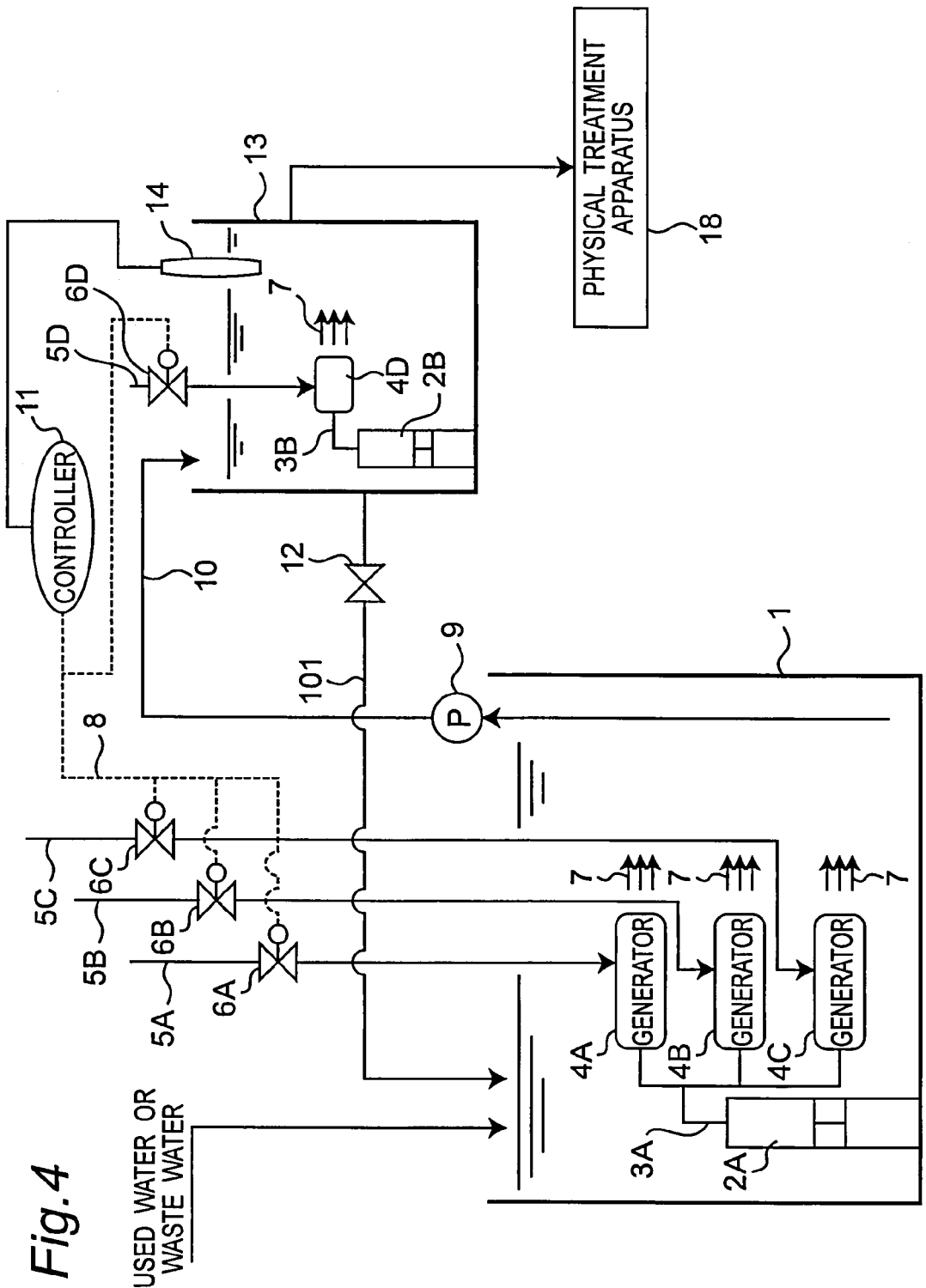
FIG. 4 is a view schematically showing a fourth embodiment of the water treatment apparatus according to the invention.

FIG. 4 shows a fourth embodiment of the water treatment apparatus according to the invention.

In the fourth embodiment, a physical treatment apparatus 18 is installed to substitute for the succeeding-step water treatment apparatus 15 of the first embodiment. In the fourth embodiment, therefore, the same constituent parts as in the first embodiment are designated by the same reference numerals, and their detailed description is omitted. Only constituent parts different from the first embodiment are explained hereinafter.

The actions of micro/nano bubbles include adsorption of contamination components in the liquid. In the fourth embodiment, the treatment water is pretreated with use of micro/nano bubbles in both the bubble treatment tank 1 and the micro/nano bubble generation state confirmation tank 13. Thereafter, the treatment water is introduced to the physical treatment apparatus 18. As the result, it is possible to reduce the load for the physical treatment apparatus 18 which is installed following the bubble treatment tank 1 and the micro/nano bubble generation state confirmation tank 13.

Specifically, in a rapid filter as an example of the physical treatment apparatus 18, a clogging phenomenon occurs due to organic matters. However, micro/nano bubbles are capable of reducing the organic load which is contamination on the rapid filter. This leads to reduction in the number of times per period on back washing performed by a rapid filtration tower. Also, replacement frequency of the filtration material in the rapid filter can be reduced since the contamination components in the treatment water are treated by adsorption thereof with use of micro/nano bubbles.

FIFTH EMBODIMENT

Figure 5:
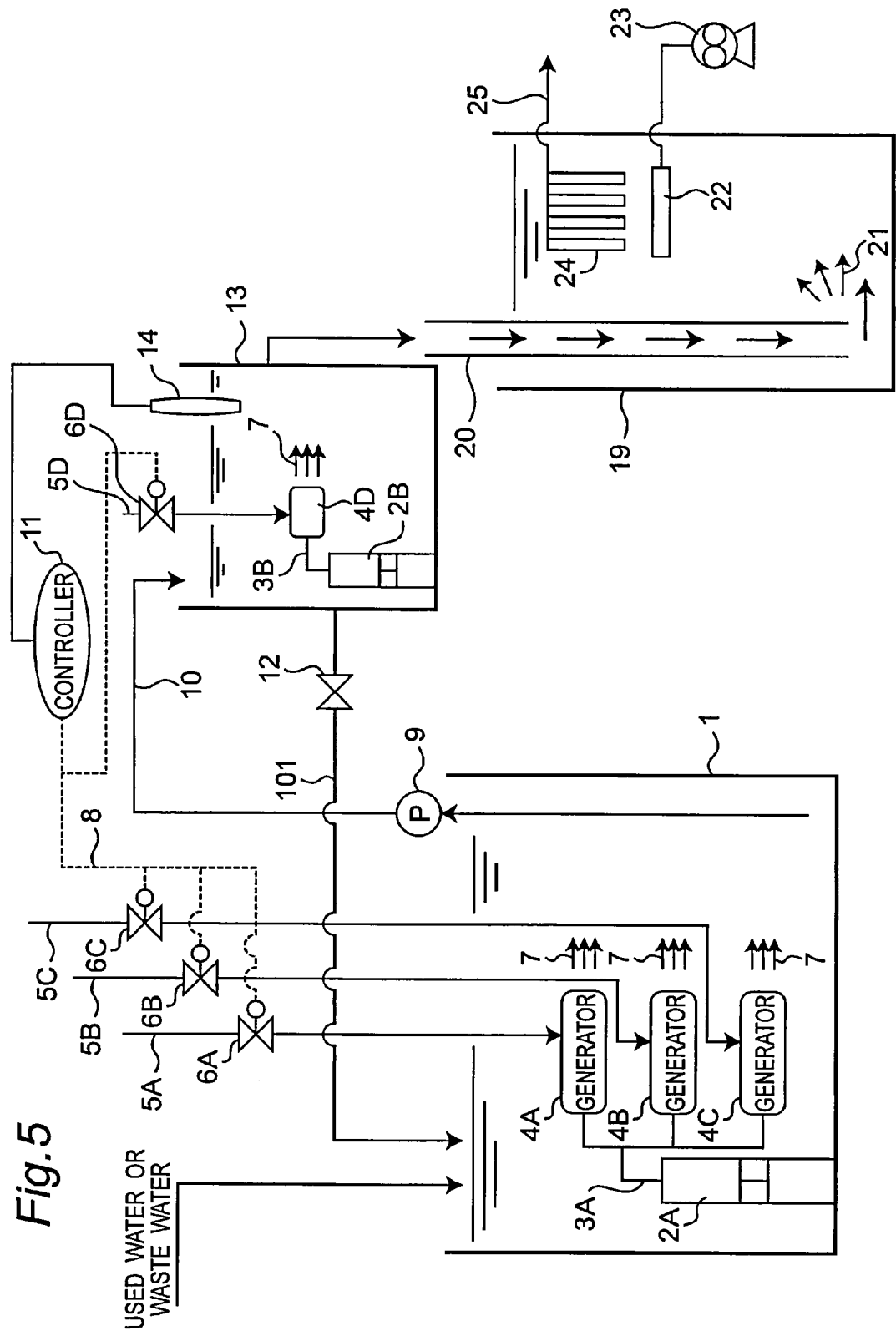
FIG. 5 is a view schematically showing a fifth embodiment of the water treatment apparatus according to the invention.

FIG. 5 shows a fifth embodiment of the water treatment apparatus according to the invention. This fifth embodiment corresponds to a modification example of the foregoing first embodiment. In the fifth embodiment, therefore, the same constituent parts as in the first embodiment are designated by the same reference numerals, and their detailed description is omitted. Only constituent parts different from the first embodiment are explained hereinafter.

In the fifth embodiment, a deep biological treatment tank 19 is installed to substitute for the succeeding-step water treatment apparatus 15 of the first embodiment.

In the fifth embodiment, the treatment water is pretreated in the bubble treatment tank 1 and the micro/nano bubble generation state confirmation tank 13, and then is introduced to the deep biological treatment tank 19. Lower-portion introductory piping 20 is installed at an end of the deep biological treatment tank 19, so that the treatment water, which is derived from the micro/nano bubble generation state confirmation tank 13, is introduced to a lower portion of the deep biological treatment tank 19 by natural power. In FIG. 5, reference numeral 21 denotes an arrow schematically showing the direction of a water flow.

Also, in the deep biological treatment tank 19, a submerged membrane 24 and gravitational piping 25 are installed on an opposite side to the lower-portion introductory piping 20, so as to efficiently treat the treatment water. The gravitational piping 25 makes the treatment water flow out by using gravity (water head difference). Further, a submerged-membrane washing blower 23 and a diffuser 22 are installed to wash the submerged membrane 24 by air. That is, the submerged membrane 24 is air washed by air discharged from the diffuser 22. As a result, the treatment performance of the submerged membrane 24 can be stably maintained.

Microorganisms, which propagate in the deep biological treatment tank 19, are activated and improved in treatment performance by micro/nano bubbles contained in the treatment water in (1) the bubble treatment tank 1 and (2) the micro/nano bubble generation state confirmation tank 13. With respect to hard-to-decompose chemical substances contained in the treatment water, in particular, the treatment water containing micro/nano bubbles shows greatly higher treatment performance in decomposability than the treatment water containing no micro/nano bubbles in the biological treatment tank. The reason for the high treatment performance is that microorganisms are activated by the micro/nano bubbles.

SIXTH EMBODIMENT

Figure 6:
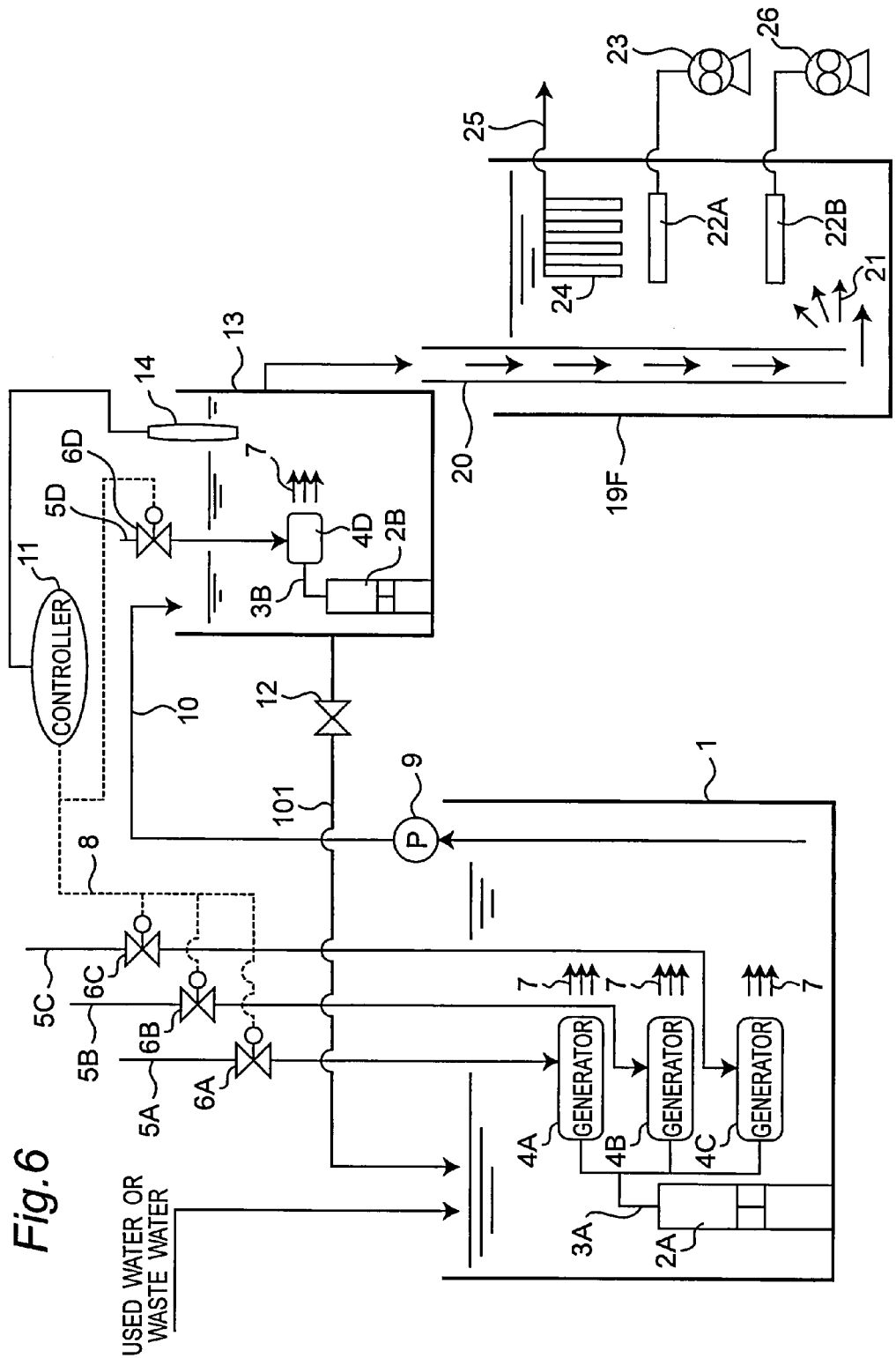
FIG. 6 is a view schematically showing a sixth embodiment of the water treatment apparatus according to the invention.

FIG. 6 shows a second embodiment of the invention. This sixth embodiment corresponds to a modification example of the foregoing fifth embodiment. In the sixth embodiment, therefore, the same constituent parts as in the fifth embodiment are designated by the same reference numerals, and their detailed description is omitted. Only constituent parts different from the fifth embodiment are explained hereinafter.

In the sixth embodiment, a deep biological treatment tank 19F is provided to substitute for the deep biological treatment tank 19. In the deep biological treatment tank 19 of the fifth embodiment, aeration means is composed of the diffuser 22 and the submerged-membrane washing blower 23. In contrast, in the deep biological treatment tank 19F of the sixth embodiment, aeration means is composed of a diffuser 22A, a submerged-membrane washing blower 23, a diffuser 22B and an agitation blower 26.

The treatment water in the deep biological treatment tank 19F is agitated as a way for highly maintaining the treatment performance of microorganisms. Specifically, the treatment water in the deep biological treatment tank 19F is sufficiently agitated, to successfully maintain aerobic microorganisms in particular, by the aeration means which is composed of the diffuser 22A, the submerged-membrane washing blower 23, the diffuser 22B and the agitation blower 26. In other words, the deep biological treatment tank 19 of this sixth embodiment can enhance the treatment performance of microorganisms much more than the deep biological treatment tank 19F of the fifth embodiment having neither the diffuser 22B nor the agitation blower 26.

SEVENTH EMBODIMENT

Figure 7:
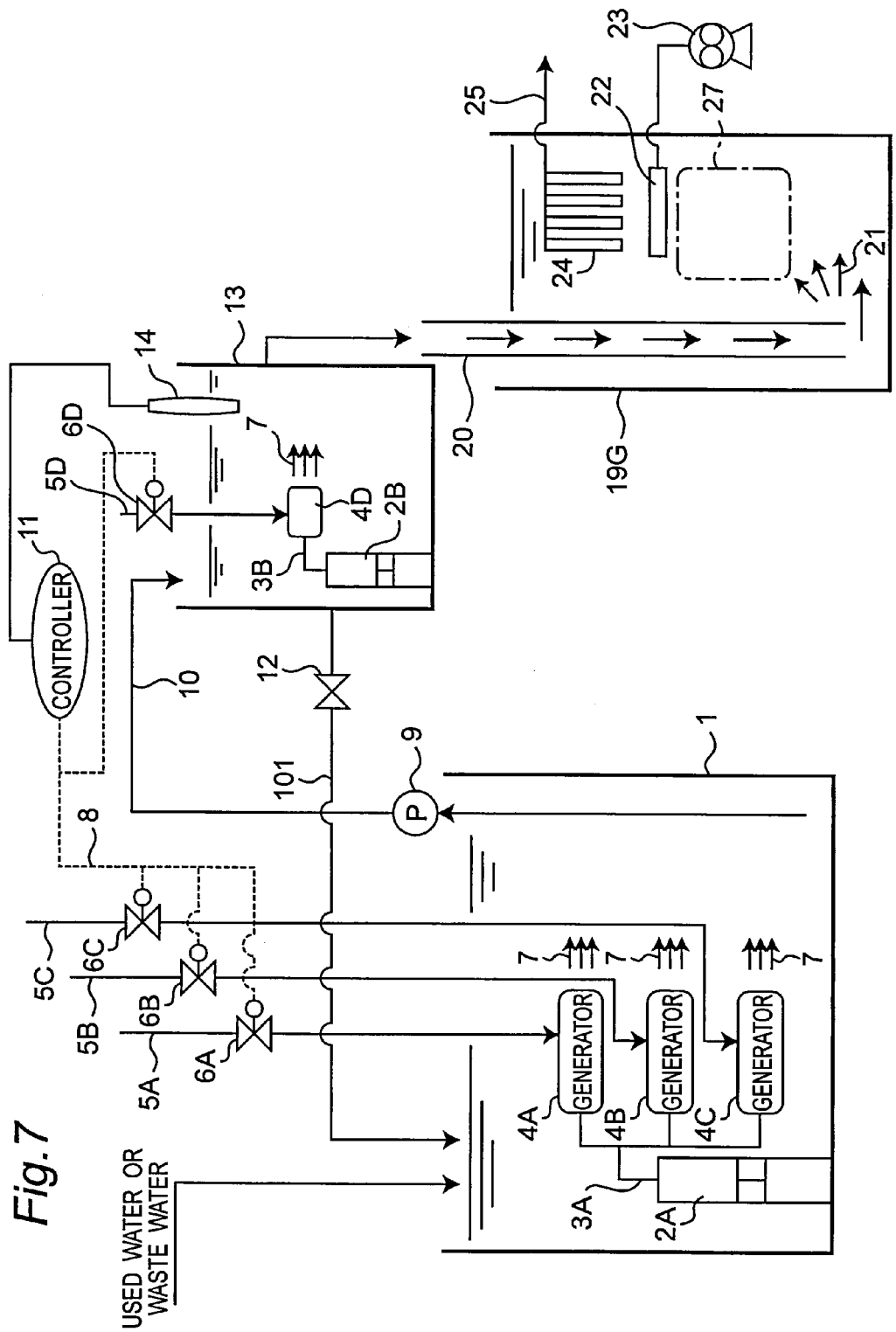
FIG. 7 is a view schematically showing a seventh embodiment of the water treatment apparatus according to the invention.

FIG. 7 shows a seventh embodiment of the invention. This seventh embodiment corresponds to a modification example of the foregoing fifth embodiment. In the seventh embodiment, therefore, the same constituent parts as in the fifth embodiment are designated by the same reference numerals, and their detailed description is omitted. Only constituent parts different from the fifth embodiment are explained hereinafter.

In the seventh embodiment, a deep biological treatment tank 19G is provided to substitute for the deep biological treatment tank 19. In the fifth embodiment, no filler is installed inside the deep biological treatment tank 19. In contrast, a polyvinylidene chloride filler 27 is installed within the tank of the deep biological treatment tank 19G in the seventh embodiment.

In the seventh embodiment, the polyvinylidene chloride filler 27 is filled in the deep biological treatment tank 19G, as a means for highly maintaining the treatment performance of microorganisms. As a result of filling the polyvinylidene chloride filler 27, microorganisms are immobilized to the filler 27 and stably propagate. Thereby, the treatment performance can be highly maintained. Therefore, the treatment performance in the deep biological treatment tank 19G of the seventh embodiment is enhanced much more than that in the deep biological treatment tank 19 of the fifth embodiment.

EIGHTH EMBODIMENT

Figure 8:
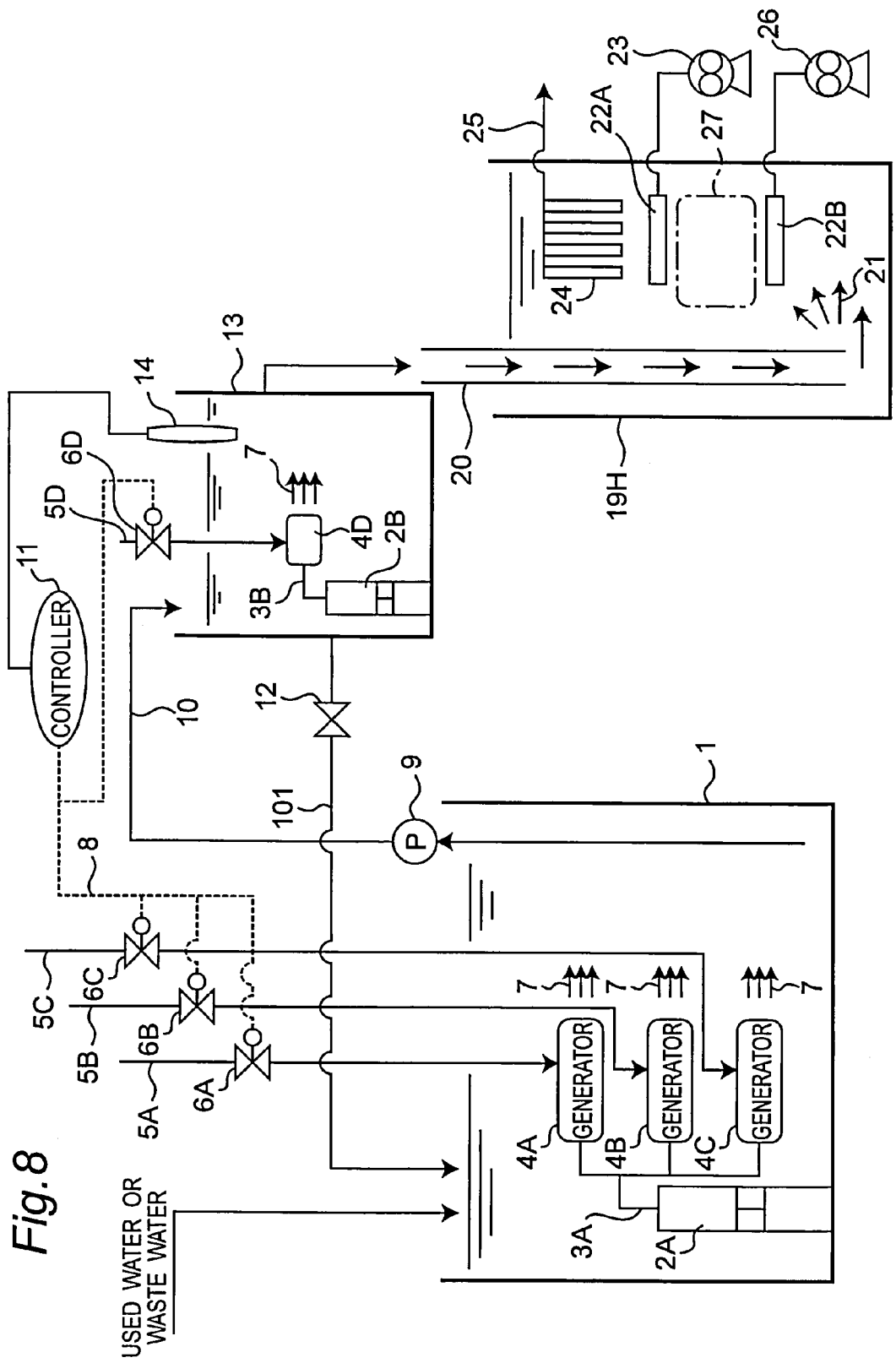
FIG. 8 is a view schematically showing an eighth embodiment of the water treatment apparatus according to the invention.

FIG. 8 shows an eighth embodiment of the water treatment apparatus according to the invention. This eighth embodiment corresponds to a modification example of the foregoing sixth embodiment. In the eighth embodiment, therefore, the same constituent parts as in the sixth embodiment are designated by the same reference numerals, and their detailed description is omitted. Only constituent parts different from the sixth embodiment are explained hereinafter.

In the eighth embodiment, a deep biological treatment tank 19H is provided to substitute for the deep biological treatment tank 19F. In the sixth embodiment, no filler is installed in the deep biological treatment tank 19F. In contrast, in the eighth embodiment, a polyvinylidene chloride filler 27 is installed in the deep biological treatment tank 19H. The polyvinylidene chloride filler 27 is placed for example between the diffuser 22A and the diffuser 22B, as shown in FIG. 8.

That is, in the eighth embodiment, the polyvinylidene chloride filler 27 is filled in the deep biological treatment tank 19H as a means for highly maintaining the treatment performance of microorganisms. As a result of filling the polyvinylidene chloride filler 27, microorganisms are immobilized to the filler 27 and stably propagate. Thereby, the treatment performance is highly maintained. Therefore, the treatment performance in the eighth embodiment is enhanced much more than that in the fifth embodiment.

NINTH EMBODIMENT

Figure 9:
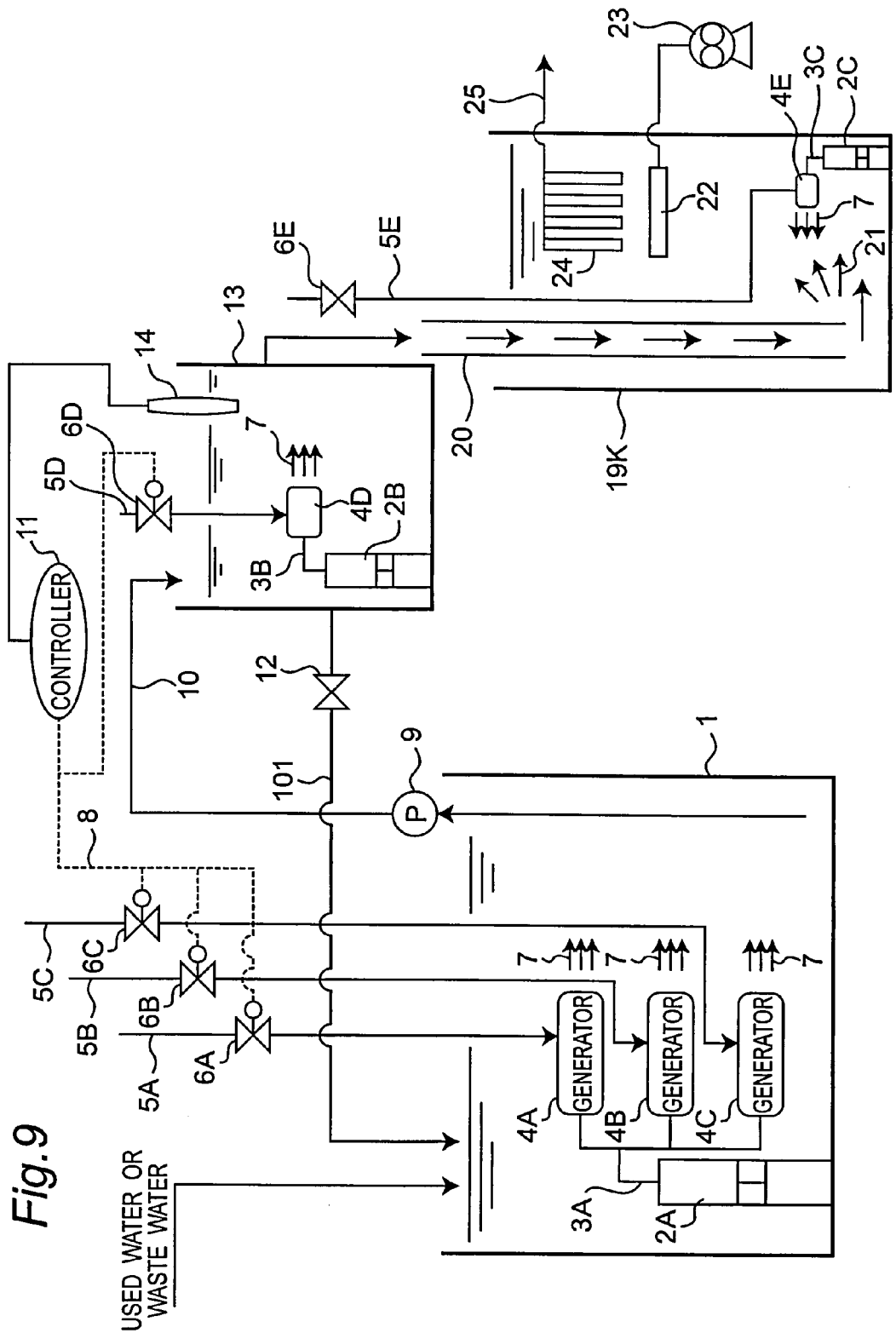
FIG. 9 is a view schematically showing a ninth embodiment of the water treatment apparatus according to the invention.

FIG. 9 shows a ninth embodiment of the water treatment apparatus according to the invention. This ninth embodiment is a modification example of the foregoing fifth embodiment. In the ninth embodiment, therefore, the same constituent parts as in the fifth embodiment are designated by the same reference numerals, and their detailed description is omitted. Only constituent parts different from the fifth embodiment are explained hereinafter.

In the ninth embodiment, a deep biological treatment tank 19K is provided to substitute for the deep biological treatment tank 19.

The deep biological treatment tank 19 of the fifth embodiment is not provided with a submerged pump, a micro/nano bubble generator, a pipe therefor and an air flow control valve in the tank 19. In contrast, in the ninth embodiment, the deep biological treatment tank 19K is provided with a submerged pump 2C, a micro/nano bubble generator 4E, and piping 3C for connecting the submerged pump 2C and the micro/nano bubble generator 4E to each other in the tank 19K. The deep biological treatment tank 19K is also provided with air suction piping 5E and an air flow control valve 6E, wherein the air suction piping 5E is connected to the micro/nano bubble generator 4E, and the air flow control valve 6E is attached to the air suction piping 5E.

In the ninth embodiment, the submerged pump 2C, the micro/nano bubble generator 4E, the air suction piping 5E and the air flow control valve 6E are installed in the deep biological treatment tank 19K as a means for maintaining the treatment performance of microorganisms to a maximum extent. Micro/nano bubbles are generated by operating the above-stated components in the deep biological treatment tank 19K. Thereby, the microorganisms are activated in the deep biological treatment tank 19K, so that the treatment performance of microorganisms can be enhanced.

TENTH EMBODIMENT

Figure 10:
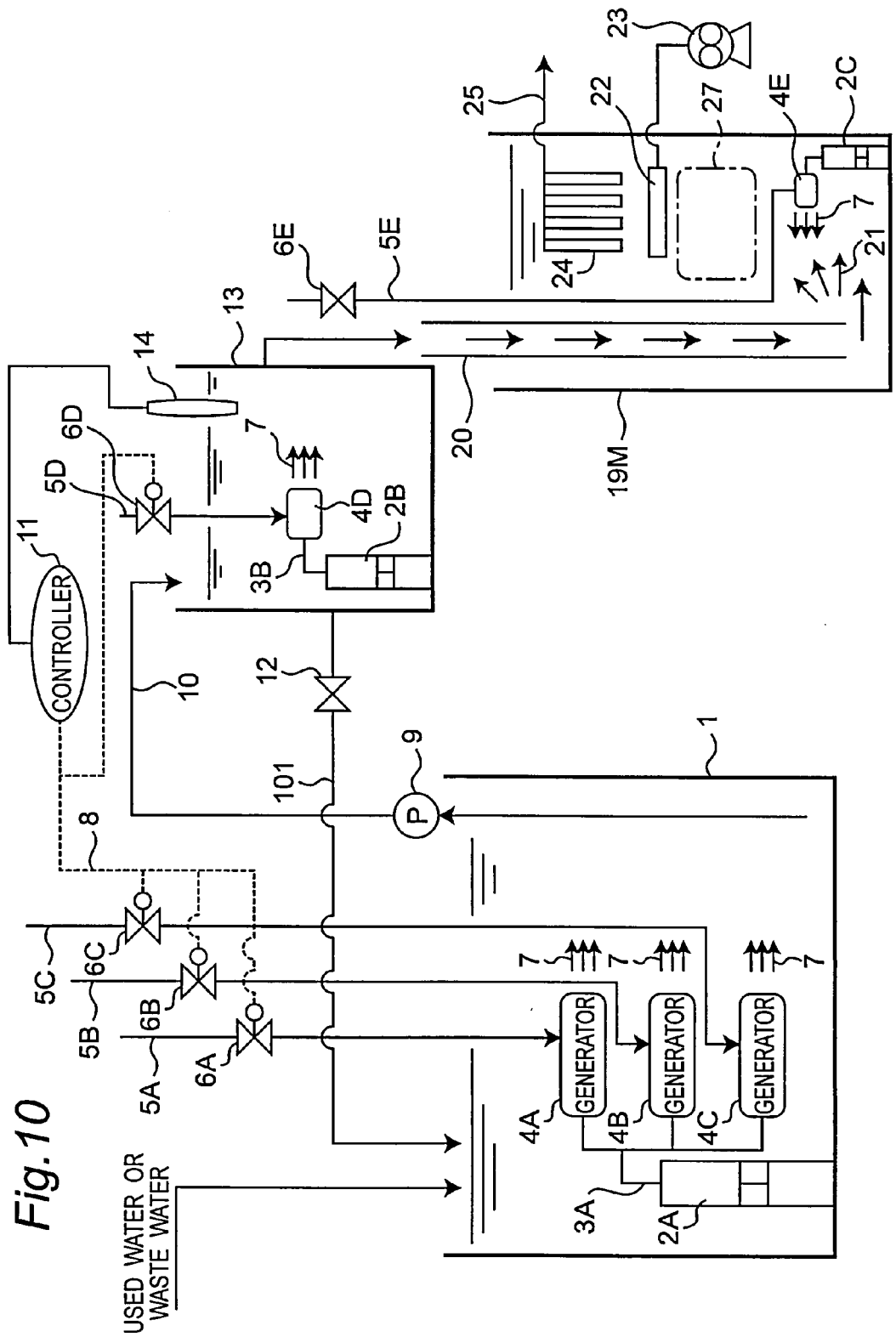
FIG. 10 is a view schematically showing a tenth embodiment of the water treatment apparatus according to the invention.

FIG. 10 shows a tenth embodiment of the water treatment apparatus according to the invention. This tenth embodiment corresponds to a modification example of the foregoing ninth embodiment. In the tenth embodiment, therefore, the same constituent parts as in the ninth embodiment are designated by the same reference numerals, and their detailed description is omitted. Only constituent parts different from the ninth embodiment are explained hereinafter.

In the tenth embodiment, a deep biological treatment tank 19M is provided to substitute for the deep biological treatment tank 19K. No polyvinylidene chloride filler 27 is installed in the deep biological treatment tank 19K of the ninth embodiment. In contrast, in the tenth embodiment, a polyvinylidene chloride filler 27 is installed in the deep biological treatment tank 19M.

That is, in the tenth embodiment, a polyvinylidene chloride filler 27 is installed in the deep biological treatment tank 19M, as a means for maintaining the treatment performance of microorganisms to a maximum extent, in addition to a submerged pump 2C, a micro/nano bubble generator 4E, piping 5E and an air flow control valve 6E. Then, micro/nano bubbles are generated by operating the above-stated components in the deep biological treatment tank 19M in this embodiment. Thus, the micro/nano bubbles activate microorganisms propagating in the polyvinylidene chloride filler 27 in the deep biological treatment tank 19M or microorganisms fluidized in the tank, so that the treatment performance of microorganisms can be enhanced to the maximum extent.

EXPERIMENTAL EXAMPLE

An experimental apparatus was fabricated, which corresponds to the water treatment apparatus of the first embodiment shown in FIG. 1. In the experimental apparatus, the capacity of the bubble treatment tank 1 was 300 liters, the capacity of the micro/nano bubble generation state confirmation tank 13 was 80 liters. After a trial run of the experimental apparatus for about two days, treatment water was continuously introduced to the bubble treatment tank 1 and the micro/nano bubble generation state confirmation tank 13 in the experimental apparatus. The treatment water was waste water discharged from a semiconductor factory. Dissolved oxygen concentration in the waste water was measured and shown in a value of 0 ppm. Then, the experimental apparatus was operated for three days in order to stabilize quality of water. Then, the dissolved oxygen concentration in the treatment water was measured at the outlet of the micro/nano bubble generation state confirmation tank 13. The measured value was 6 ppm.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A water treatment apparatus comprising:
    a first bubble treatment tank to which treatment water is introduced and which has a plurality of first micro/nano bubble generators;
    a second bubble treatment tank to which the treatment water derived from the first bubble treatment tank is introduced and which has a second micro/nano bubble generator and a detection part for detecting a generation state of bubbles; and
    a control part for controlling operations of the first and second micro/nano bubble generators based on the generation state of bubbles detected by the detection part;
    wherein the first and second micro/nano bubble generators generate bubbles having a diameter of not more than 50 µm and not less than 100 nm, which bubbles dissipate or continue to exist in water.

2. The water treatment apparatus as set forth in claim 1, further comprising:
    first air suction piping connected to the first micro/nano bubble generator;
    second air suction piping connected to the second micro/nano bubble generator;
    a first air flow control valve connected to the first air suction piping; and
    a second air flow control valve connected to the second air suction piping, wherein
    the detection part is a turbidity meter for detecting turbidity of treatment water within the second bubble treatment tank, and
    the control part controls an opening of the first air flow control valve and an opening of the second air flow control valve in an interlocked manner based on a signal representing the turbidity inputted from the turbidity meter.

3. The water treatment apparatus as set forth in claim 1, wherein
    the first bubble treatment tank has a submerged pump having header piping to which the plurality of the first micro/nano bubble generators are connected.

4. The water treatment apparatus as set forth in claim 1, further comprising
    a subsequent-step water treatment apparatus to which the treatment water derived from the second bubble treatment tank is introduced.

5. The water treatment apparatus as set forth in claim 4, wherein
    the subsequent-step water treatment apparatus is a biological treatment apparatus.

6. The water treatment apparatus as set forth in claim 4, wherein
    the subsequent-step water treatment apparatus is a chemical treatment apparatus.

7. The water treatment apparatus as set forth in claim 4, wherein
    the subsequent-step water treatment apparatus is a physical treatment apparatus.

8. The water treatment apparatus as set forth in claim 1, further comprising
    a biological treatment tank to which the treatment water derived from the second bubble treatment tank is introduced and which has a submerged membrane.

9. The water treatment apparatus as set forth in claim 8, wherein
    the biological treatment tank is a deep biological treatment tank having lower-portion introductory piping for introducing the treatment water derived from the second bubble treatment tank.

10. The water treatment apparatus as set forth in claim 9, wherein
    the deep biological treatment tank has a polyvinylidene chloride filler.

11. The water treatment apparatus as set forth in claim 10, wherein
    the deep biological treatment tank has:
    a first diffuser located above the polyvinylidene chloride filler and below the submerged membrane, and
    a second diffuser located below the polyvinylidene chloride filler.

12. The water treatment apparatus as set forth in claim 9, wherein
    the deep biological treatment tank has a micro/nano bubble generator.

13. The water treatment apparatus as set forth in claim 12, wherein
    the deep biological treatment tank has a submerged pump having header piping to which the micro/nano bubble generator is connected.

14. The water treatment apparatus as set forth in claim 12, wherein
    the deep biological treatment tank has
    a polyvinylidene chloride filler.

* * * * *